US012717699B2

(12) United States Patent
Wang et al.

(10) Patent No.: US 12,717,699 B2
(45) Date of Patent: Aug. 25, 2026

(54) DEBUGGING MICROSERVICES WITHIN CONFIDENTIAL COMPUTING

(71) Applicant: INTERNATIONAL BUSINESS MACHINES CORPORATION, Armonk, NY (US)

(72) Inventors: Heng Wang, Changping District (CN); Xiao Ling Chen, Changping District (CN); Hernan A. Cunico, Holly Springs, NC (US); Zhan Peng Huo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 18/891,912

(22) Filed: Sep. 20, 2024

(65) Prior Publication Data

US 2026/0086920 A1 Mar. 26, 2026

(51) Int. Cl.
*G06F 11/362* (2025.01)
*G06F 11/3698* (2025.01)
(Continued)

(52) U.S. Cl.
CPC ........ *G06F 11/362* (2013.01); *G06F 11/3698* (2025.01); *G06F 21/606* (2013.01); *G06F 21/62* (2013.01); *G06F 2221/034* (2013.01)

(58) Field of Classification Search
CPC .. G06F 11/362; G06F 11/3698; G06F 21/606; G06F 21/62
See application file for complete search history.

(56) References Cited

U.S. PATENT DOCUMENTS

| | | | |
|---|---|---|---|
| 9,804,952 | B1 | 10/2017 | Cohen et al. |
| 10,366,227 | B2 | 7/2019 | Bacher et al. |

(Continued)

FOREIGN PATENT DOCUMENTS

| | | |
|---|---|---|
| CN | 109523128 A | 3/2019 |
| CN | 116346907 A | 6/2023 |

OTHER PUBLICATIONS

Java Debug Wire Protocol (posted on Oracle.com) (Year: 2023).*
(Continued)

*Primary Examiner* — Shirley X Zhang
(74) *Attorney, Agent, or Firm* — Aaron Pontikos, Esq.; Rachel L. Pearlman, Esq.; Heslin Rothenberg Farley & Mesiti P.C.

(57) ABSTRACT

Computer implemented methods, systems, and computer program products include program code executing on a processor(s) (in the confidential computing environment), obtaining, from an untrusted computing resource, via a secure channel between the confidential computing environment and the untrusted computing resource, a debugging command in a command request packet. The processor(s) analyzes the packet to determine a security level for the debugging command and a security level for the confidential computing environment, wherein the analyzing comprises comparing a quantitative value of the security level for the debugging command to a quantitative value of the security level for the confidential computing environment. The processor(s) generates a command reply packet, wherein contents of the command reply packet and based on the comparing. The processor(s) transmits the command reply packet to the untrusted computing resource via the secure channel.

17 Claims, 9 Drawing Sheets

(51) Int. Cl.
*G06F 21/60* (2013.01)
*G06F 21/62* (2013.01)

(56) References Cited

U.S. PATENT DOCUMENTS

| | | | | |
|---|---|---|---|---|
| 11,829,278 | B2 | 11/2023 | Umesh et al. | |
| 2010/0287562 | A1* | 11/2010 | Jazdzewski | G06F 11/3698 717/124 |
| 2012/0131555 | A1* | 5/2012 | Hossain | G06F 11/362 717/124 |
| 2021/0342174 | A1* | 11/2021 | Bursell | G06F 9/45558 |
| 2023/0041147 | A1 | 2/2023 | Lu et al. | |
| 2023/0195597 | A1 | 6/2023 | Guzman et al. | |
| 2025/0370918 | A1 | 12/2025 | Wang et al. | |

OTHER PUBLICATIONS

Intel Corporation. Debugging Intel® Software Guard Extensions (Intel® SGX) Enclaves for Linux* Operating System. 2018.
Bursell, Mike. “Confidential Computing: logging and debugging.” Confidential Computing Consortium. Jun. 14, 2023.
Hong, Zhen et al. “SDVisor: Secure Debug Enclave with Hypervisor.” 2019 IEEE International Conference on Service-Oriented System Engineering (SOSE). 2019.
IBM. “IBM Secure Execution for Linux”, retrieved from web https://web.archive.org/web/20221116050617/https://www.ibm.com/downloads/cas/O158MBWG?mhsrc=ibmsearch_a&mhq=Secure%20execution%20for%20Linux, Nov. 16, 2022, 4 pages.
IBM. “What is confidential computing?”, retrieved from web https://web.archive.org/web/20240214081048/https://www.ibm.com/topics/confidential-computing, Feb. 14, 2024, 8 pages.

* cited by examiner

| Category | Command | Explanation | Security Level | |
|---|---|---|---|---|
| Start and Control Program Execution | run (r) | Starts the program. | * | |
| | continue (c) | Continues the program after a breakpoint. | * | ** |
| | step (s) | Executes the next line of code, stepping into functions. | * | ** |
| | next (n) | Executes the next line of code, stepping over functions. | * | ** |
| | finish | Runs until the current function is finished. | * | ** |
| | kill | Terminates the current debugging session. | *** | |
| Breakpoints | break (b) | Sets a breakpoint. | * | |
| | delete | Deletes breakpoints. | * | |
| | disable | Disables breakpoints. | * | |
| | enable | Enables breakpoints. | * | |
| Inspect and Modify Data | print (p) | Prints the value of a variable. | ** | |
| | set | Sets a new value for a variable. | *** | |
| | display | Automatically displays the value of a variable after each step. | ** | |
| | undisplay | Stops the automatic display of a variable. | * | |
| | examine (x) | Examines memory at a given address. | ** | |
| Program Status and Control Flow | backtrace (bt) | Displays the call stack. | * | ** |
| | frame (f) | Selects a frame in the call stack. | * | ** |
| | up | Moves up in the call stack. | * | ** |
| | down | Moves down in the call stack. | * | ** |
| | info | Displays various types of information like breakpoints, threads, registers. | * | ** |
| Source Code and Assembly Level Debugging | list (l) | Lists source code. | * | |
| | disassemble | Displays disassembly of the executable. | * | ** |
| Multi-Thread/Multi-Process Debugging | thread | Switches between threads or displays thread information. | * | ** |
| | process | Start/Pause/terminate process,continue/step/next execution,view Process status | *** | |
| Other Commands | help | Displays help for a command. | * | |
| | quit (q) | Quits GDB. | * | |

FIG. 6

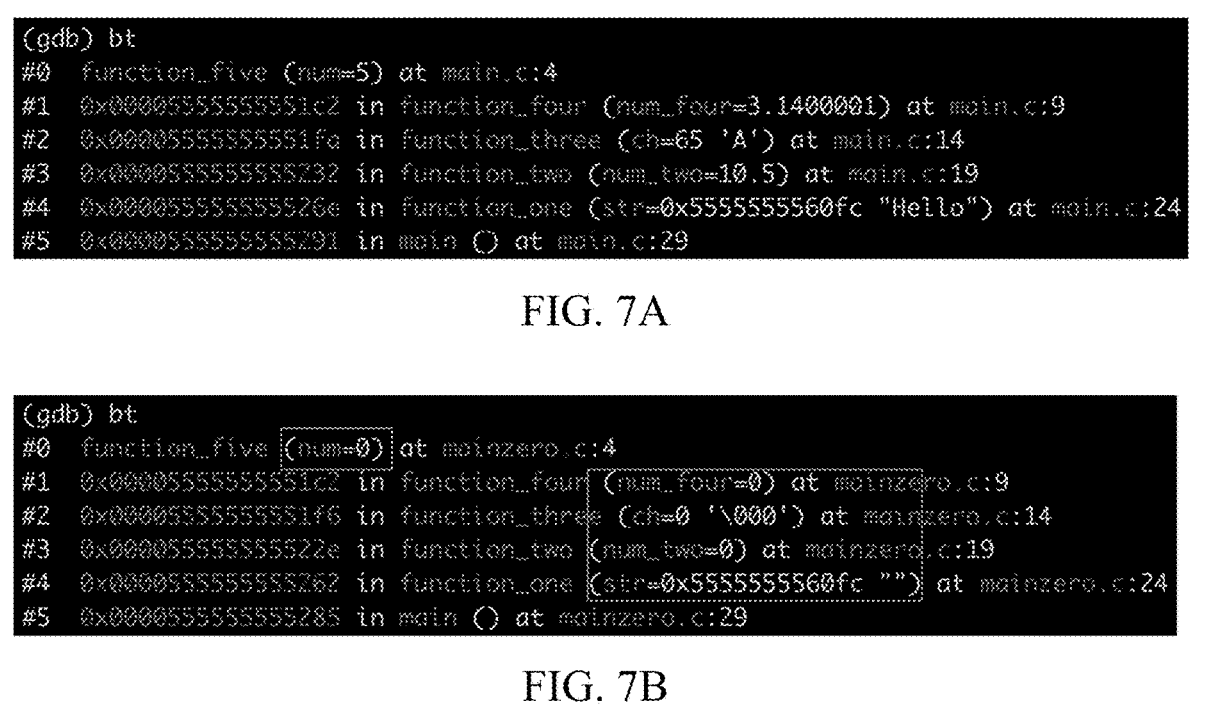

```
(gdb) bt
#0  function_five (num=5) at main.c:4
#1  0x00005555555551c2 in function_four (num_four=3.1400001) at main.c:9
#2  0x00005555555551fa in function_three (ch=65 'A') at main.c:14
#3  0x0000555555555232 in function_two (num_two=10.5) at main.c:19
#4  0x000055555555526e in function_one (str=0x5555555560fc "Hello") at main.c:24
#5  0x0000555555555291 in main () at main.c:29
```

FIG. 7A

```
(gdb) bt
#0  function_five (num=0) at mainzero.c:4
#1  0x00005555555551c2 in function_four (num_four=0) at mainzero.c:9
#2  0x00005555555551f6 in function_three (ch=0 '\000') at mainzero.c:14
#3  0x000055555555522e in function_two (num_two=0) at mainzero.c:19
#4  0x0000555555555262 in function_one (str=0x5555555560fc "") at mainzero.c:24
#5  0x0000555555555285 in main () at mainzero.c:29
```

FIG. 7B

DEBUGGING MICROSERVICES WITHIN CONFIDENTIAL COMPUTING

BACKGROUND

The present invention relates generally to the field of confidential computing, and in particular, to a method for securely debugging microservices in a confidential computing framework.

A microservice architecture is a method of developing software systems that enables support for a range of platforms and devices, including but not limited to, web-enables devices, mobile devices, Internet of Things (IoT) devices, and wearables. Because of this cross-platform and cross-device flexibility, this architecture is often utilized in shared computing systems and distributed systems, including in cloud computing systems. Presently, microservices are seeing increased use in these cloud computing environments. A microservice architecture provides a method for developing software applications, which are also referred to herein as information services, as suites of independently deployable, small, modular services, in which each service runs a unique process and communicates through a well-defined, lightweight, mechanism to serve a defined goal (e.g., a database scheduling (e.g., management) service is an example of a software that can be deployed as a microservice). Thus, a microservice architecture can be utilized to deploy multiple services that work together as a unique application. In this architecture, the overall versioning is represented by the sum of the single service code version. The multiplicity of the services provides a cohesive software solution across devices and platforms.

There is no industry consensus regarding the properties of microservices, and an official definition is missing as well. For purposes of this document, a "microservice" is defined as set of code that includes instructions and data for performing a computational function (called a "service") in a manner so that: (i) the microservice can be used with other microservices to make applications in the form of collections of loosely coupled services; (ii) the service provided by the microservice is fine-grained; and (iii) the protocols of the microservice are lightweight.

Some other possible characteristics of microservices may include one, or more, of the following (herein collectively referred to as the Twenty Possible Microservices Characteristics"): (i) services in a microservice architecture (MSA) are often processes that communicate over a network to fulfill a goal using technology-agnostic protocols (herein referred to as "network-communicative microservices"); (ii) microservices respectively provide services that are independently deployable (herein referred to as "independently deployable microservices"); (iii) the services are easy to replace (herein referred to as "easily replaceable microservices"); (iv) services are organized around capabilities (for example, user interface front-end, recommendation, logistics, billing, etc.) (herein referred to as "capability-centric microservices"); (v) services can be implemented using different programming languages, databases, hardware and software environment, depending on what fits best (herein referred to as generically-implementable microservices"); (vi) messaging enabled; (vii) bounded by contexts; (viii) autonomously developed, (ix) decentralized; (x) built and released with automated processes (herein referred to as "automated microservices"); (xi) naturally enforces a modular structure; (xii) lends itself to a continuous delivery software development process; (xiii) a change to a small part of the application only requires rebuilding and redeploying only one or a small number of services; (xiv) adheres to principles of business-driven development (for example, domain-driven design); (xv) uses IDEAL cloud application architectures; (xvi) uses polyglot programming and persistence; (xvii) uses lightweight container deployment; (xviii) exhibits decentralized continuous delivery; (xix) uses DevOps with holistic service monitoring; and/or (xx) provides characteristics that are beneficial to scalability. Employing microservices enables the breaking down of complex applications into simpler independent processes.

Confidential Computing is a security and privacy-enhancing computational technique focused on protecting data in use. Confidential computing can be used in conjunction with storage and network encryption, which protect data at rest and data in transit respectively.

SUMMARY

Shortcomings of the prior art are overcome, and additional advantages are provided through the provision of a computer-implemented method for securely debugging a microservice in a confidential computing environment. The method can include obtaining, by one or more processors in the confidential computing environment, from an untrusted computing resource, via a secure channel between the confidential computing environment and the untrusted computing resource, a debugging command in a command request packet. The method can include analyzing, by the one or more processors, command request packet to determine a security level for the debugging command and a security level for the confidential computing environment, wherein the analyzing comprising comparing a quantitative value of the security level for the debugging command to a quantitative value of the security level for the confidential computing environment. The method can include generating, by the one or more processors, a command reply packet, wherein contents of the command reply packet are based on the comparing. The method can include transmitting, by the one or more processors, the command reply packet to the untrusted computing resource via the secure channel.

Shortcomings of the prior art are overcome, and additional advantages are provided through the provision of a computer program product for securely debugging a microservice in a confidential computing environment. The computer program product comprises a storage medium readable by a one or more processors and storing instructions for execution by the one or more processors for performing a method. The method includes, for instance, obtaining, by the one or more processors in the confidential computing environment, from an untrusted computing resource, via a secure channel between the confidential computing environment and the untrusted computing resource, a debugging command in a command request packet. The method can include analyzing, by the one or more processors, command request packet to determine a security level for the debugging command and a security level for the confidential computing environment, wherein the analyzing comprising comparing a quantitative value of the security level for the debugging command to a quantitative value of the security level for the confidential computing environment. The method can include generating, by the one or more processors, a command reply packet, wherein contents of the command reply packet are based on the comparing. The method can include transmitting, by the one or more processors, the command reply packet to the untrusted computing resource via the secure channel.

Shortcomings of the prior art are overcome, and additional advantages are provided through the provision of a system for securely debugging a microservice in a confidential computing environment. The system includes: a memory, one or more processors in communication with the memory, and program instructions executable by the one or more processors via the memory to perform a method. The method includes obtaining, by the one or more processors in the confidential computing environment, from an untrusted computing resource, via a secure channel between the confidential computing environment and the untrusted computing resource, a debugging command in a command request packet. The method can include analyzing, by the one or more processors, command request packet to determine a security level for the debugging command and a security level for the confidential computing environment, wherein the analyzing comprising comparing a quantitative value of the security level for the debugging command to a quantitative value of the security level for the confidential computing environment. The method can include generating, by the one or more processors, a command reply packet, wherein contents of the command reply packet are based on the comparing. The method can include transmitting, by the one or more processors, the command reply packet to the untrusted computing resource via the secure channel.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6 depicts one or more aspects of the present disclosure;

FIGS. 7A and 7B illustrate one or more aspects of the functionality described in the present disclosure;

DETAILED DESCRIPTION

Figure 1:
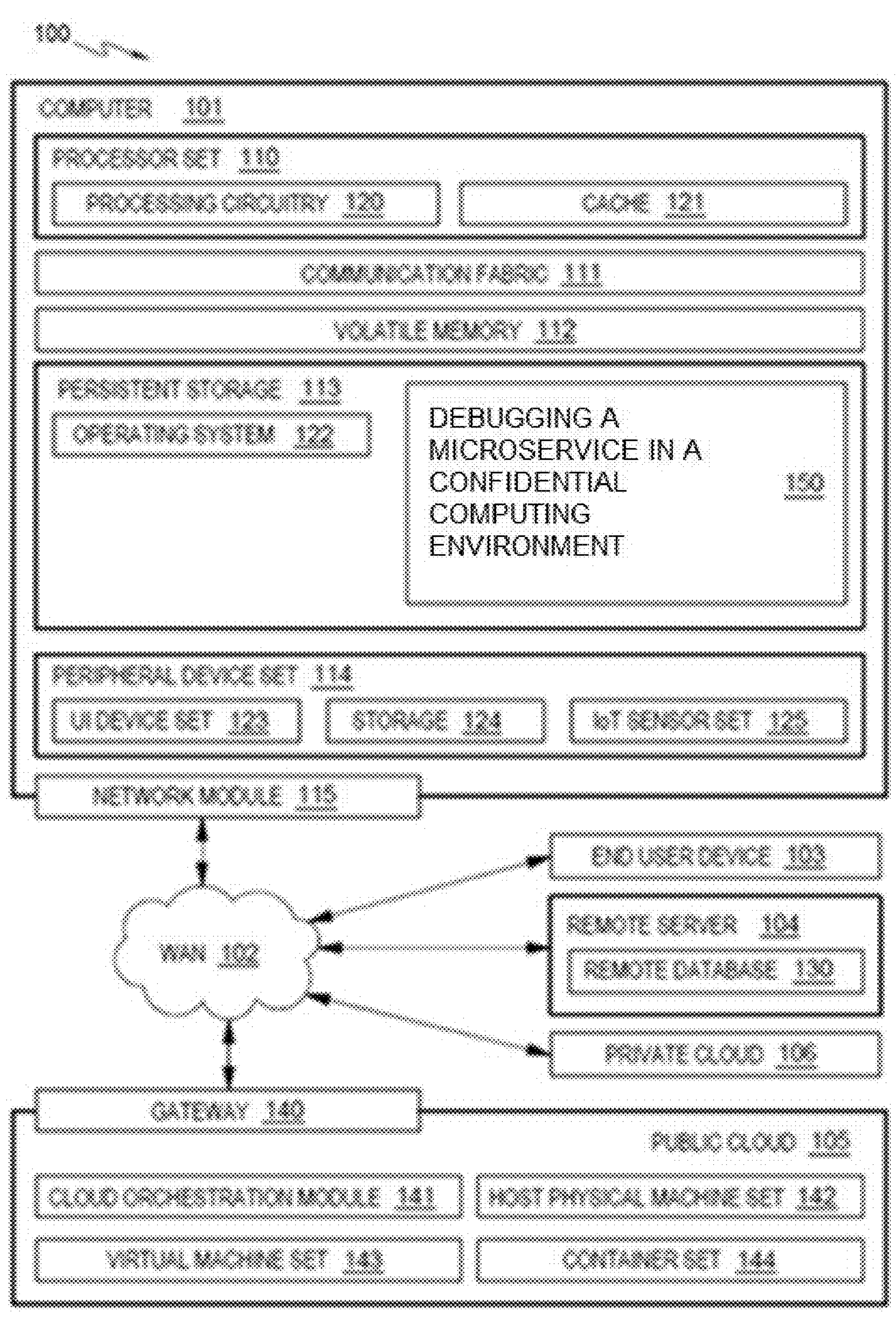
FIG. 1 depicts one example of a computing environment to perform, include and/or use one or more aspects of the present disclosure.

Confidential computing is a computational technique designed to enhance security and privacy by safeguarding data while it is being processed. A key investigative tool in computing is a debugger but aspects of a debugger can be incompatible with confidential computing and can compromise the security of confidential computing, which occurs in a trusted execution environment (TEE), which can also be referred to as a trusted computing environment. As explained in greater detail herein, existing approaches to this issue can potentially compromise the security of the TEE. For example, a user utilizing a debugger in a confidential computing environment could control and alter a process flow of a microservice and write to memory and registers. Altering the flow of a microservice and writing to the memory and registers could pollute the runtime environment and potentially threaten the data storage of the microservice. For example, when a user accesses the microservice to generate a key and store it in the database, if the debugger alters the key in memory, this alteration could lead to the contamination of the key stored in the database. The examples herein disclose computer-implemented methods, computer program products, and systems that enable debugging in microservices within confidential computing environments but either bolster or maintain the security of the confidential computing environment rather than compromising it.

The examples herein include computer-implemented methods, computer program products, and computer systems that enhance the technical architecture of a computing environment that includes a TEE, as well as the TEE itself, to enable additional functionality to promote secure debugging. The examples herein mitigate security risks when debugging a microservice within a confidential computing environment, including in a distributed computing environment such as a cloud computing environment. The functionality will be discussed in greater detail herein, but, generally, the examples include program code, referred to herein as a debugger security analysis module that comprises program code which intercepts command (CMD) request packets from a debugging service and analyzes them. Whether the debugging can proceed for a given microservice in a TEE depends upon the security level of the command as compared to the security level of the confidential computing environment for debugging (e.g., confidential computing debugging security level). If the command security level exceeds the confidential computing debugging security level, program code (e.g., the debugger packet analysis module), executing on one or more processors, instructs program code (e.g., a debugger packet generating and cleaning module) to deny permission to execute the debugging. The program code (e.g., of the debugger packet generating and cleaning module) can return a permission denied packet to the debugging service. When command security level does not exceed the confidential computing debugging security level, program code (e.g., the debugger packet analysis module), executing on one or more processors, forwards the CMD request packet to a debugger service and returns a CMD reply packet from the debugger service to the user (e.g., providing debugging information). As will be discussed herein, the command security level of certain commands may be more than one level, and when this situation arise, in cases that will be discussed in greater detail herein, program code in the examples herein can return certain elements of the CMD request packet while omitting others. As will be describe in greater detail, certain of the examples herein introduce different exemplary confidential computing debugging security levels (evaluated by the program code when a request for debugging a microservice is received).

As will be described in greater detail herein, the computer implemented methods, computer program products, and computer systems described herein introduce new aspects into a confidential computing architecture (e.g., TEE) which enable secure debugging of microservices executing in this environment. For ease of understanding, certain of the functionalities are separated into distinct modules, however, this is a non-limiting configuration provided for illustrative purposes only as various functionalities can be implemented in the same module as well as more than two modules. Discussions herein utilize distinct modules just for ease of understanding and not to suggest any limitations.

Two aspects illustrated as two modules introduced into the technical architecture of TEE are a debugger security analysis module which comprises program code that analyzes CMD request packets sent by a debugger client. Program code comprising the debugger security analysis module intercepts CMD request packets and analyzes them, determining whether to enable or deny the debugging (depending on how the program code routes the request, based on the security levels discussed above). Meanwhile, program code comprising a debugger packet generating and cleaning module, based on the earlier analysis, can either produce a permission denied response (e.g., packet) or erase sensitive values within a debugger CMD reply packet received from a debugger server.

The security decisions made by the program code in these modules and the subsequent activities of the program code are based, at least in part, on security levels of debugger commands. Although the examples herein introduce three levels, these levels are provided as examples. However, the exemplary levels are: 1) workflow observation; 2) data observation; and 3) workflow and data operation. The functionality of a debugging command executed in a TEE is impacted by these levels. For example, the workflow observation level enables access to a microservice workflow with no capability for the debugger to inspect memory and register values. The data observation level is a median level that enables users (processes) to observe memory and register values (but not to modify them). A workflow and data operation level provides the most access, permitting not only observation but also the modification of the program's workflow, memory, and register values. Hence, the modules and the security levels are implemented in a TEE architecture and together, enable debugging of microservices in a manner that mitigates security risks, preserving the confidentiality of the computing environment.

Utilizing the multiple security levels allows the program code performing analysis and generation and cleaning to evaluate responses to debugging commands received and return different results depending on the security level. The use of security levels limits exposure of registers, which could lead to issues, while enabling a requestor to obtain certain useful debugging information. A non-limiting example is when a backtrace command is the debugging command. A backtrace shows a list of function calls that are currently active. A backtrace is useful for the purposes of logging or diagnostics. When a backtrace command is issued, the response of the program code in the examples herein varies based on security levels. Using the level examples, when the confidential computing debugging security level is data observation, program code (e.g., comprising a debugger security analysis module) forwards the CMD request packet to the debugger server and returns a CMD reply packet from the debugger server to the user. However, using the backtrace feature, when the confidential computing debugging security level is workflow observation, program code (e.g., comprising a debugger security analysis module) forwards the CMD request packet to the debugger server and passes the CMD reply packet from the debugger server to program code (e.g., comprising a debugger packets generating and cleaning module), so that this program code can retain the parts of the CMD reply packet related to the program workflow, erase the variable values in the CMD reply packet, and then return the revised CMD reply packet to the user.

The examples herein are inextricably tied to computing and are directed to a practical application. The examples herein are directed to the practical application of enabling the debugging of microservices in a confidential computing environment. This is a challenge unique to computing. Confidential computing itself is inextricably linked to computing. Confidential computing is a security and privacy-enhancing computational technique focused on protecting data in use. Confidential computing can be used in conjunction with storage and network encryption, which protect data at rest and data in transit, respectively. Enabling debugging of microservices maintains the security and confidentiality of the computing environment but also prevents errors from disrupting processing, as debugging of microservices utilized in confidential environments is enabled. The examples herein are inextricably tied to computing at least because the examples disclosed herein address an issue unique to computing in a specific type of computing environment, utilizing an approach that is inextricably tied to computing which includes implementing changes in a computing architecture, including implementing security levels and modifying packet data based on security levels.

The examples herein provide more than existing approaches to debugging microservices in confidential computing environments (e.g., TEEs). Existing approaches utilized what can be considered coarse controls to enable some debugging of microservices in confidential computing environment in that these existing approaches carry with them security risks which are not present with the existing approach. For example, in one existing approach, which will be discussed in greater detail herein in FIG. 4, a privilege separation container was added to the environment. Utilizing this container avoided exposing new ports in the TEE and filtered irrelevant packets. However, utilizing a debugger with this approach could control and alter the process flow of a microservice, and write to memory and registers, thereby potentially polluting the runtime environment and potentially threatening the data storage of the microservice. For example, when utilizing this existing approach, when a user accessed the microservice to generate a key and store it in the database, if the debugger altered the key in memory, this change it could lead to the contamination of the key finally stored in the database. In the examples herein, a debugger can be utilized in a confidential computing environment to debug a microservice without exposing the register. Hence, the examples herein provide significantly more at least because they enable the desired practical application while limiting the security risk in a manner not possible when utilizing existing approaches.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for debugging microservices in confidential computing environments 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

Figure 2:
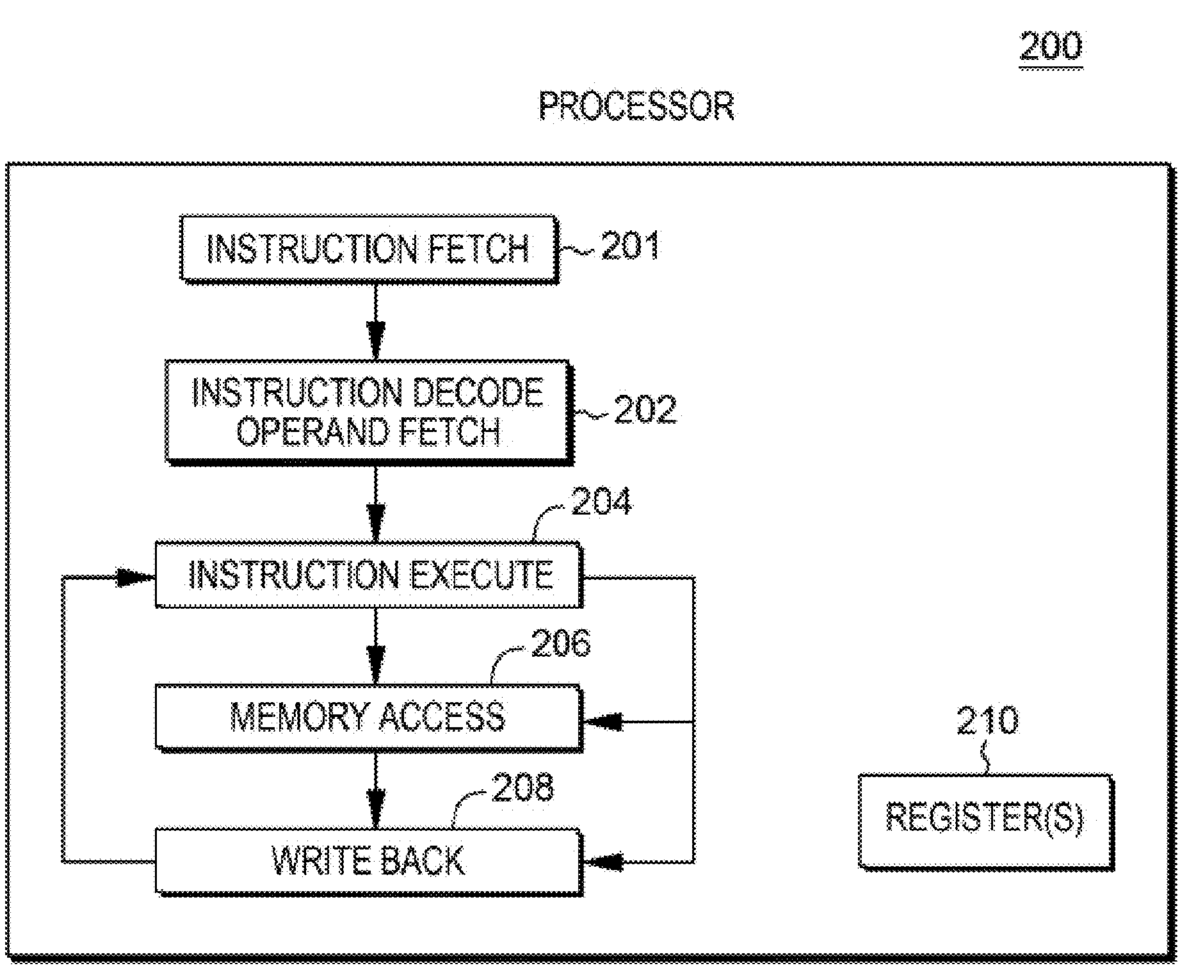
FIG. 2 depicts one example of a processors in a computing environment to perform one or more aspects of the present disclosure.

In one example, a processor (e.g., of processor set 110) includes a plurality of functional components (or a subset thereof) used to execute instructions. As depicted in FIG. 2, in one example, a processor 200 includes, for instance, an instruction fetch component 201 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use processing code to debug a microservice in a confidential computing environment 150. Additionally, fewer, and/or other components may be used in one or more aspects of the present disclosure.

The examples herein provide computer-implemented methods, computer program products, and computer systems for use in debugging microservices in technical environments that include confidential computing that include a common customer deployment with containerized microservices in a Trusted Execution Environment (TEE). In confidential computing design, microservices that need to be debugged in TEE are not accessible from outside the container. Thus, the examples herein provide an approach to debug these microservices in the absence of the access to the TEE.

Figure 3:
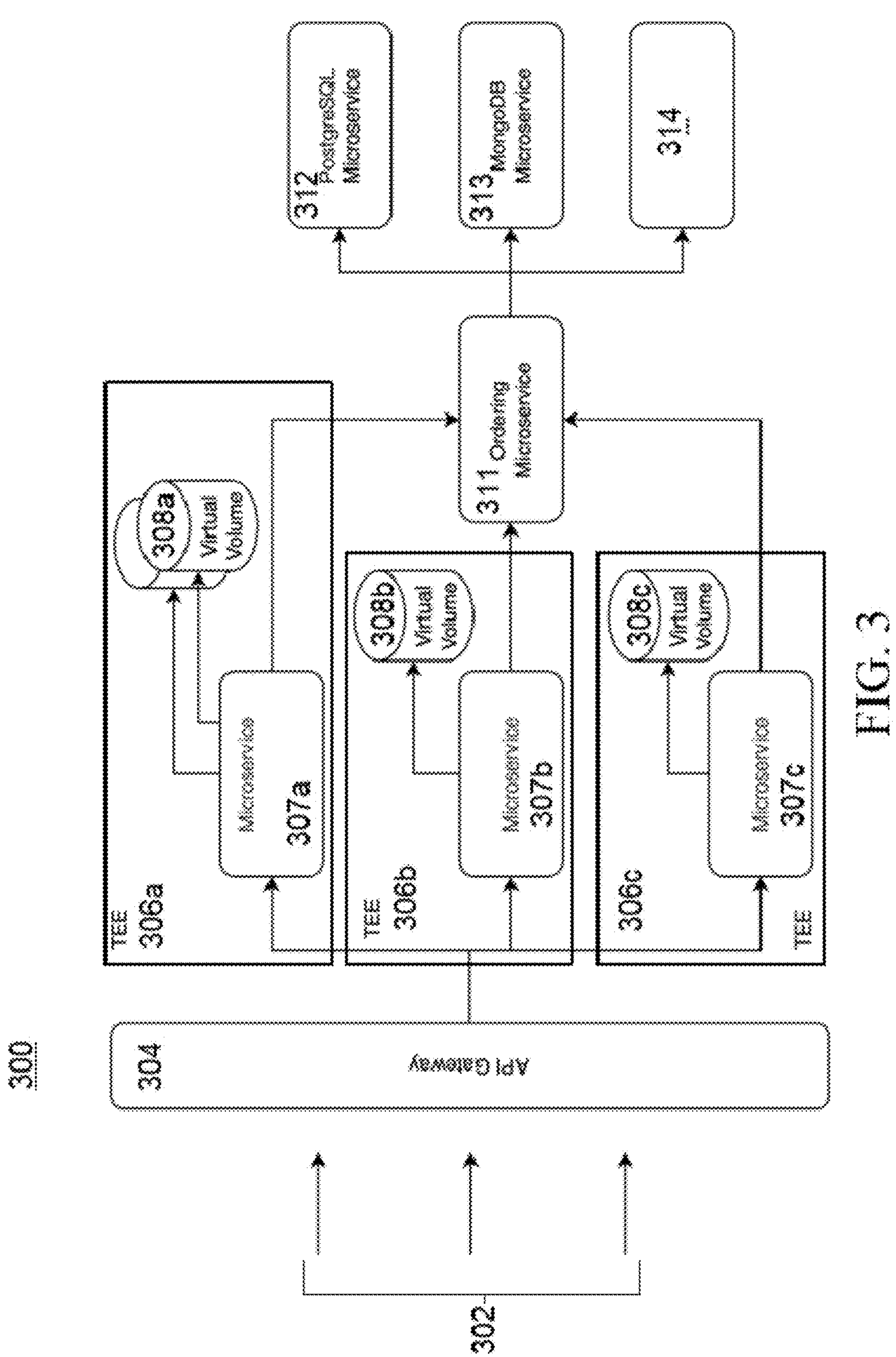
FIG. 3 is an illustration of a computing environment into which one or more aspects of the present disclosure can be implemented.

FIG. 3 depicts a technical environment 300 for confidential computing. This environment provides one example of such an environment and is provided herein to illustrate the issue with debugging microservices in TEEs, which is that to maintain confidential computing security measures, this type of access is not enabled. In this example, containerized microservices were deployed in TEEs. In this technical architecture 300, a user cannot utilize a secure shell (SSH) protocol to debug the microservices deployed in the TEEs because SSH is disabled. The technical environment 300 includes an application programming interface (API) gateway 304 to three TEEs 306*a*-306*c* (this number is provided as an illustrative example and not to suggest or implement any limitations), each configured to access at least one virtual volume 308*a*-308*c* (memory) within its own secure environment. The microservices 307*a*-307*c* deployed in the TEEs 306*a*-306*c* reside in a docker containers (in this example) in each TEE, and are accessed via the API gateway. In some examples, the API gateway receives a call 302 and responsive to a call, accesses the microservice 307*a*-307*c* in the respective TEE 306*a*-306*c*. An ordering microservice 311 outside of the TEEs handles the output or results of the microservices 307*a*-307*c* executed within the TEEs 306*a*-306*c* and can distribute the results to various other microservices or other computing resources in the environment. As a non-limiting example, FIG. 3 depicts PostgreSQL 312 (an open-source relational database management system) and MongoDB 313 (a source-available, cross-platform, document-oriented database program), as well as additional resource 314. Hence, the ordering microservice 311 can provide the output from the TEEs to various components outside of the TEE for further processing. Although a user can obtain debugging information from microservices outside of the TEEs, this information is not available from the microservices 307*a*-307*c* deployed inside of the TEEs 306*a*-306*c*.

Figure 4:
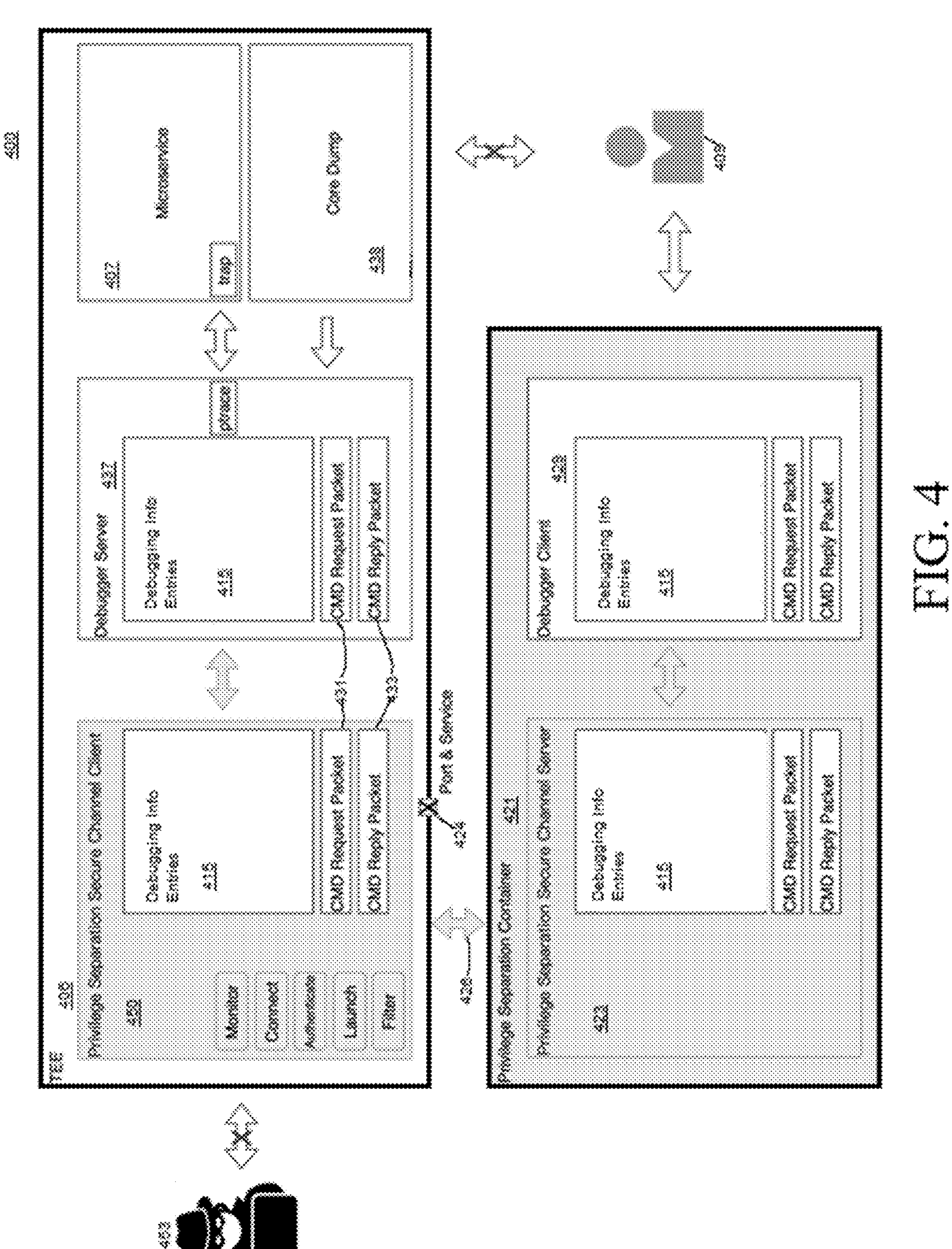
FIG. 4 is an illustration of technical environment that includes components that provide an existing approach for debugging microservices in a confidential computing environment.
Figure 5:
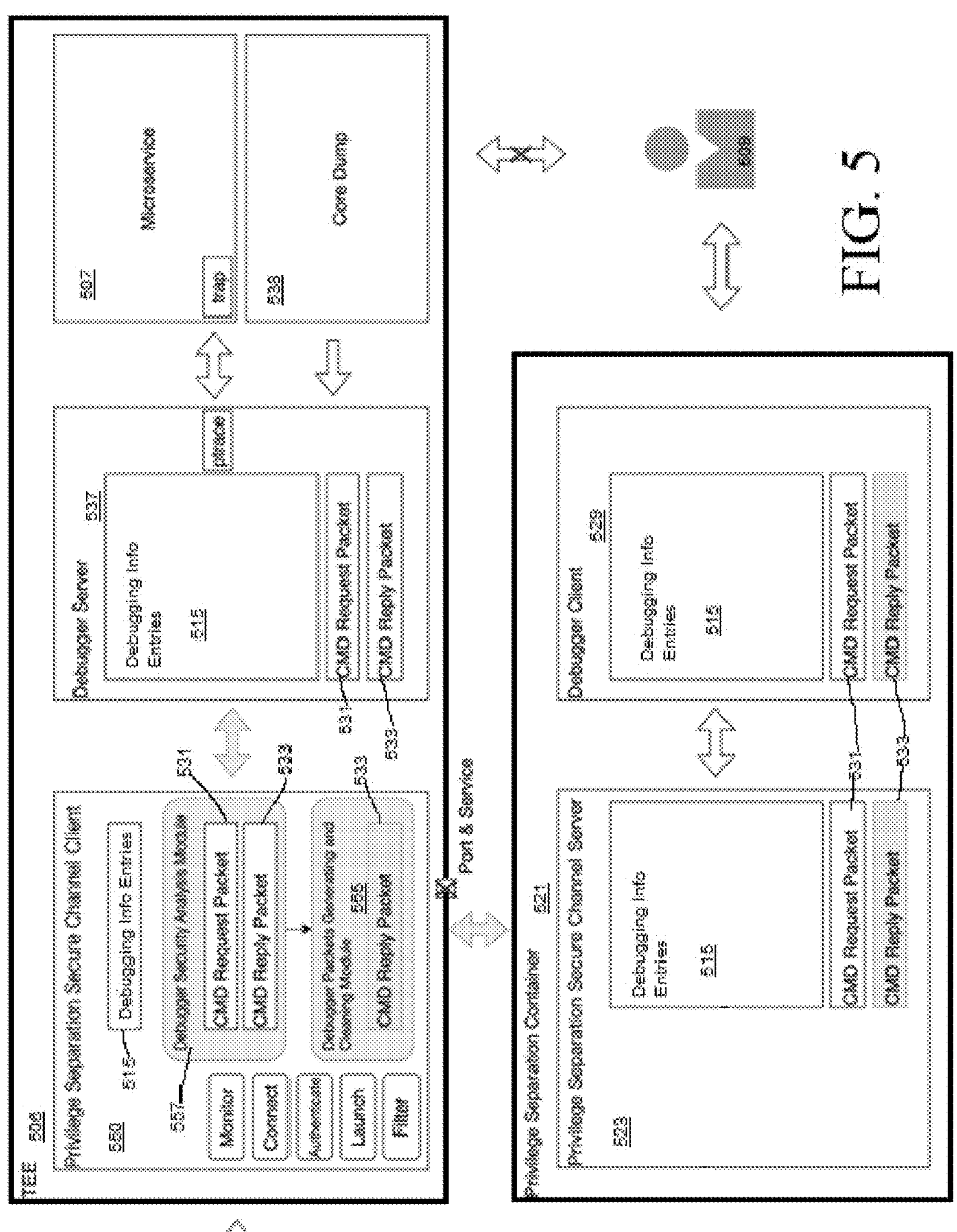
FIG. 5 is an illustration of technical environment that includes components that perform certain of the aspects described in this disclosure for debugging microservices in a confidential computing environment.

FIG. 4 illustrates aspects of a technical computing environment 400 into which an existing approach for debugging microservices in a confidential computing environment was implemented. But as discussed earlier, this approach causes security concerns because it can expose registers. FIG. 4 is included to contrast with the examples herein, of which aspects are illustrated in FIG. 5.

As will be described relative to FIG. 4, a container is implemented and used to establish a secure connection to a TEE, and it is through this secure connection that filtered debugging information can be transmitted. Implementing the container does not involve opening any new ports to the TEE nor does it add new services to the ports which avoids potential common vulnerabilities and exposures (CVEs) 453 in these services, especially future zero-day vulnerabilities. However, the approach can control and alter a process flow of a microservice and write to memory and registers and thus represents a risk to the security of the environment.

As illustrated in FIG. 4, the technical computing environment 400 includes a privilege separation container 421, which is utilized to debug a microservice 407 in a TEE 406. The privilege separation container 421 includes a secure channel, referred to herein as a privilege separation secure channel 423. A client monitors a port 424 of the privilege separation container 421. When the client (e.g., program code executing on one or more processors of a computing resource in the technical environment 400) detects that the privilege separation container 421 and its corresponding secure channel server 423, have been activated, the program code establishes a connection with the privilege separation secure channel server 423. After the program code establishes the connection 426 and verifies identity, the program code launches a debugger server 437 in the TEE 406. The program code controls the debugger server 437 to attach to the microservice 407 or to read in a core dump 438, and to prepare for subsequent debugging.

Program code of the privilege separation container 412, after it is launched (when executing on one or more processors), sets up the privilege separation secure channel server 423 and launches a debugger client 429. The privilege separation container 412 and its components are outside of the TEE 406. The program code of the privilege separation container 412 maintains a connection with the separation security channel client 450 in the TEE 406 to transmit debugger information which can include debugging information entries 415, CMD request packets 431, and CMD reply packets 433, for debugging purposes.

However, when the program code (of the privilege separation container 421) transmits the debugging information via the privilege separation secure channel server 423 to the TEE environment's privilege separation security channel client 450, this program code of the privilege separation security channel client 450 performs a security check and filters of the debugging information to ensure security. Once the client 450 has filtered the information, the program code can send the information to the debugging separation secure channel server 423. The results returned by the debugging separation secure channel server 423 traverse the same route. The user can access debugging information in the privilege separation container 421 but not in the TEE 406.

In the technical architecture 400 of FIG. 4, a privilege separation container 421 was implemented to avoid exposing new ports in the TEE 406 and to filter irrelevant packets. However, this technical architecture 400 did expose the TEE 406 to risks when debugging the microservice 407 because the debugger (debugger server 437) can access and write the memory of the microservice 407. For example, when a user 409 accesses the microservice 407 to generate a key and store it in the database, if the debugger alters the key in memory, it could lead to the pollution of the key finally stored in the database. The technical architecture 500 of FIG. 5 provides an approach to debugging a microservice without exposing the TEE to the risks of FIG. 4. Specifically, the example illustrated in FIG. 5 depicts an approach to debugging a microservice in a TEE (e.g., of a confidential computing environment, including in a cloud computing environment) where the security of the debugging the microservice is arguably enhanced (or at least maintained).

Figure 8:
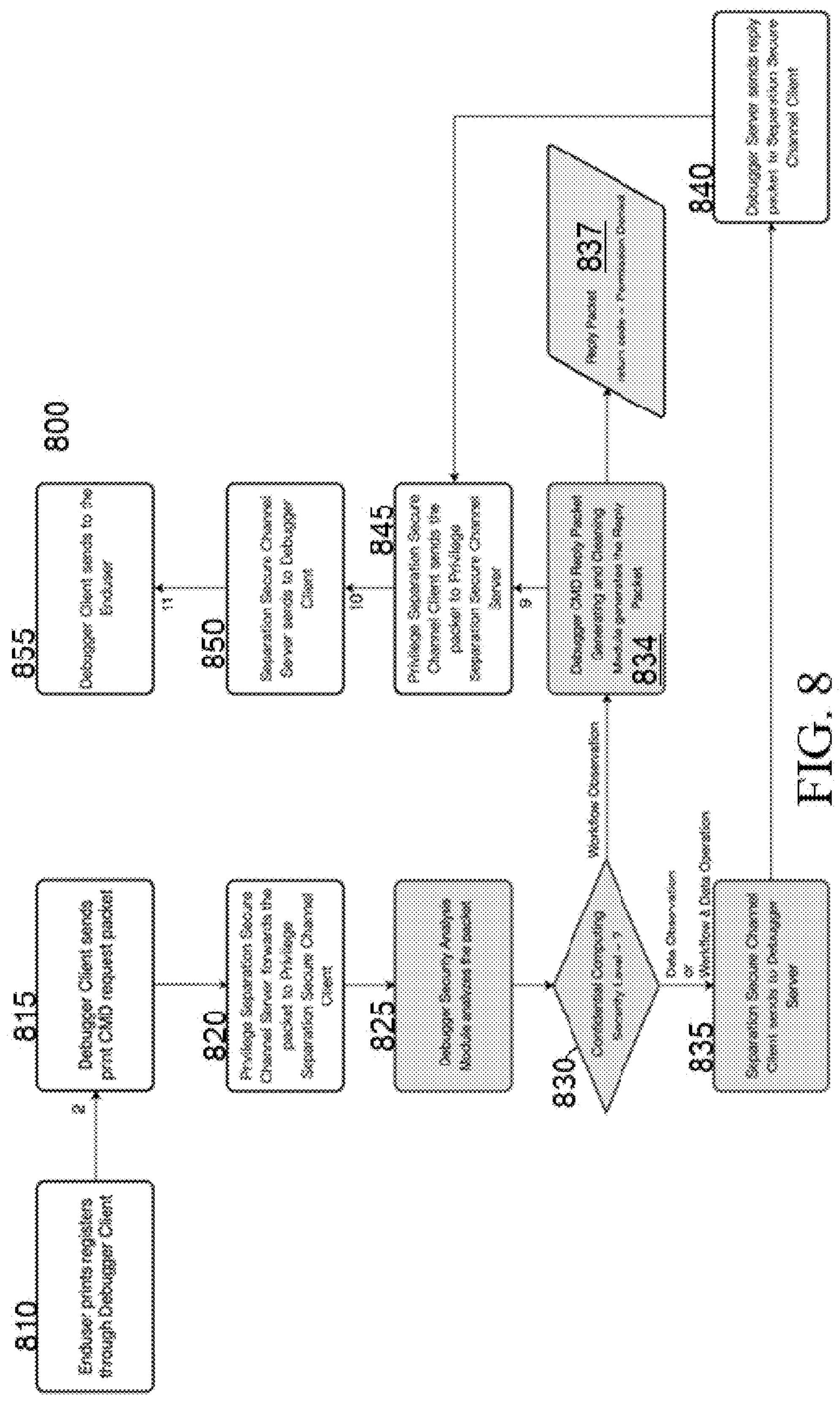
FIG. 8 is a workflow that provides an overview of various aspects performed by the program code (executing on one or more processors) in some embodiments of the present disclosure.
Figure 9:
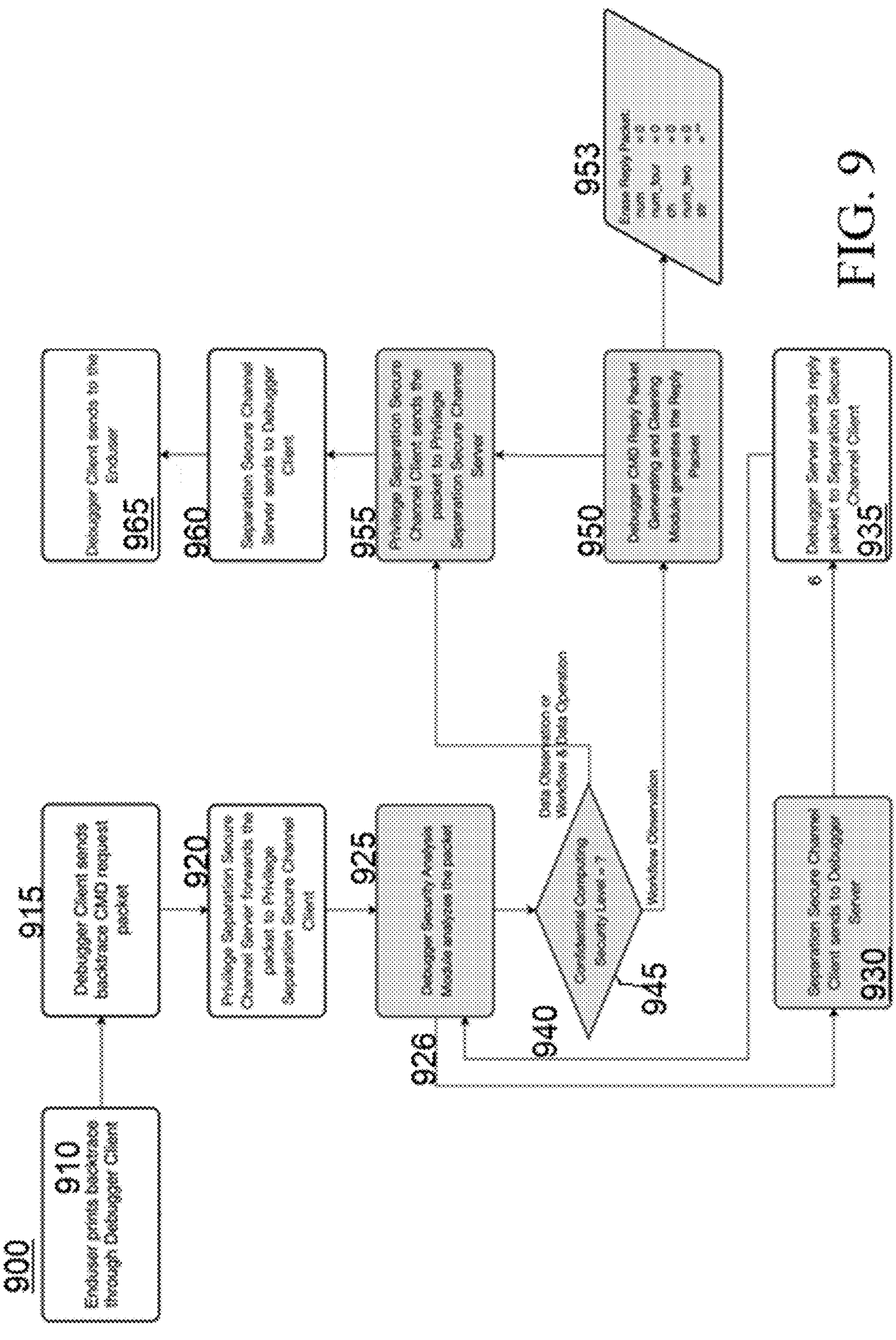
FIG. 9 is a workflow that provides an overview of various aspects performed by the program code (executing on one or more processors) in some embodiments of the present disclosure.

The technical architecture 500 of FIG. 5 is inclusive of many elements of the technical architecture of FIG. 4 but adds or re-works certain aspects to avoid the security concerns present in FIG. 4. While FIG. 5 provides an overview of aspects of a technical environment 500 into which aspects of the examples herein can be implemented, FIGS. 8-9 illustrate workflows 800 900 practiced by the elements illustrated in FIG. 5.

Returning to FIG. 5, various functionalities in this implementation are separated into modules as an example of an implementation and the example in FIG. 5 was selected for illustrative purposes only. The various functionalities can be combined into one or many modules. In this example, new aspects in this technical architecture 500, which will described in greater detail herein include debugger security analysis module 557, and a debugger packets cleaning and generating module 555, which are implemented as part of a privilege separation secure channel client 550. As will be described in greater detail herein, a security level is implemented in connection with various aspects of the system and based on this security level, certain types of results are provided (or are not provided) to user via a debugger client 529. The confidential computing debugging security levels can be understood as three distinct tiers: workflow observation, data observation, and workflow and data operation. Workflow observation is a level that solely enables access to microservice workflow, devoid of any capability to inspect memory and register values. Data observation has permission to observe memory and register values. Finally, workflow and data operation permits not only observation but also the modification of the program's workflow, memory, and register values.

In FIG. 6 these levels are designated by one to three asterisks. A single asterisk coordinates with a first level, a workflow observation level, signifying that the command observes a workflow of the process. This particular level can be understood as being a safest level because it observes a workflow, not data, and it does not manipulate the workflow or the data. A second level, symbolized by two asterisks, is a data observation level, where, in addition to observing the workflow, the command also monitors the values of variables. Hence, commands of this level present a higher potential security challenge because they enable additional functionality. A third level, symbolized by three asterisks, referred to as workflow and data operation, indicates the ability to modify both the workflow and variables. These commands would include the most functionality. Thus, while a level 1 command (first level) would have the least risk associated with it, a level 3 (third level) command would have the highest level of risk associated with it.

Utilizing the multiple security levels allows the program code performing analysis and generation and cleaning to evaluate debugging commands received and return different results depending on the security level. The use of security levels limits exposure of registers, which could lead to issues, while enabling a requestor to obtain certain useful debugging information.

A non-limiting example is when a backtrace command is the debugging command (requested by a user). A backtrace shows a list of function calls that are currently active. A backtrace is useful for the purposes of logging or diagnostics. When a backtrace command is issued, the response of the program code in the examples herein varies based on security levels. Using the level examples, when the confidential computing debugging security level is data observation, program code (e.g., comprising a debugger security analysis module) forwards the CMD request packet to the debugger server and returns a CMD reply packet from the debugger server to the user. However, using the backtrace feature, when the confidential computing debugging security level is workflow observation, program code (e.g., comprising a debugger security analysis module) forwards the CMD request packet to the debugger server and passes the CMD reply packet from the debugger server to program code (e.g., comprising a debugger packets generating and cleaning module), so that this program code can retain the parts of the CMD reply packet related to the program workflow, erase the variable values in the CMD reply packet, and then return the erased CMD reply packet to the user. As illustrated in FIG. 6, the "print" command, which prints the value of a variable, is rated as level 2 with two asterisks. Certain commands can be associated with more than one security level. The "backtrace" command was mentioned above and depending on its implementation, it can be used to observe the workflow as well as to monitor variables. Hence, the backtrace command can have either level 1 security or level 2 security. Level 1 would refer to its use when observing workflow, but to monitor variable, the security level would be a level 2. The lowest level represents the least risk while the highest level represents the highest risk. These levels are preconfigured in the examples herein but additional implementations of levels that separate debugging commands based on security concerns could be implemented in additional examples.

Returning the FIG. 5, as illustrated herein, program code comprising the debugger security analysis module 557 intercepts CMD request packets 531 and analyzes them. An intercepted CMD request packet 531 is illustrated within the debugger security analysis module 557 to illustrate how it was intercepted by the program code of the debugger security analysis module 557. Program code comprising the debugger security analysis module 557 scrutinizes CMD request packets 533 originating from the debugger client 529. In some examples, if the program code determines that a user's permissions are lower than the system's permissions, the program code directs the CMD request packet 531 to the debugger service and forwards the CMD reply packets 531 returned by the service to program code comprising a debugger packets cleaning and generating module 557 for data cleansing.

In one example, the program code of the debugger security analysis module 557 determines if the security level of the command in the intercepted packet exceeds a confidential computing debugging security level. The confidential computing debugging security level, in these example, can be workflow observation (level 1), data observation (level 2), or workflow and/or data operation (level 3). As aforementioned, the lower levels present a lower risk. Thus, if the program code of the debugger security analysis module 557 determines that the security level of the intercepted command (in the CMD request) exceeds the confidential computing debugging security level, this program code forwards the CMD request to the program code of a debugger packets generating and cleaning module 555, which returns a permission denied packet (not separately illustrated) as a CMD reply packet 533 to the user 509 (who requested the debugging command). The program code of the debugger packets generating and cleaning module 555, depending on the scenario, which is discussed in greater details below, can either generate a permission denied packet or the program code can erase sensitive values within the debugger CMD Reply Packet received from the debugger server 537. Thus, if the program code of the debugger security analysis module 557 determines that the security level of the intercepted command (in the CMD request) does not exceed the confidential computing debugging security level, program code of the debugger security analysis module 557 forwards the CMD request packet 533 to the debugger server 537 (rather than passing the packet to the debugger packets generating and cleaning module 555). The program code of the debugger server 537 returns a CMD reply packet 533 to the user 509.

For certain commands intercepted by the debugger security analysis module 557, the security level may not be uniform. This dichotomy is illustrated in FIG. 6, as certain commands are illustrated as being attributed to more than one security level. One such command is backtrace, which displays a call stack, and is either a level 1 or a level 2 command. The program code of the elements comprising the privilege separation secure channel client 550 will return different CMD reply packets depending on the system security level and the usage of the command. For example, in a system where the system security level is a data observation level (e.g., level 1), when a backtrace is issued (in a command), and the confidential computing debugging security level of the backtrace command is a data observation level (e.g., level 1), when the program code of the debugger security analysis module 557 intercepts the command packet, the program code of the debugger security analysis module 557 forwards the request packet to the debugger server 537, which returns a CMD reply packet to the user 509 (ultimately). However, when the confidential computing debugging security level is workflow observation (e.g., level 2), when the program code of the debugger security analysis module 557 intercepts the command packet (for the backtrace), the program code of the debugger security analysis module 557 forwards the request packet to the debugger packets generating and cleaning module 555, which generates a CMD reply packet 533 that includes only the parts of the reply packet (to the executed backtrace command) related to the program workflow (e.g., level 1), but omits all variable values (e.g., level 2) and returns a CMD replay packet 533 to the user 509 that includes only the workflow observation data. In some examples, the security level returned for a debugging command can depend on a security level associated with a user who issued that command. For example, a user 509 may have clearance to receive results for a level 1 debugging command but not for any higher-level debugging command.

The alternative treatments of the backtrace command in a system with the TEE and a system security level of a workflow observation level (e.g., level 1) are illustrated in FIGS. 7A and 7B. The system security level (and/or the security level permission of the user) was set to workflow observation at the commencement of the confidential computing. In these examples, the user, including via a debugger client, enters a backtrace command. In the absence of the components implemented and illustrated in FIG. 5, i.e., in the technical environment of FIG. 4, the reply packet responsive to the backtrace command packet would return the function stack and the values of variables, an example of which is FIG. 7A. In the technical architecture illustrated in FIG. 5, when the backtrace command is issued, because certain aspects of the backtrace command had a higher security level that the system (or user) security level, the packet returned includes the workflow (level 1) and not the data variables themselves (level 2). A difference between FIG. 7A and FIG. 7B is that in FIG. 7B, the program code of a debugger packets generating and cleaning module 555, removed the variables and thus, the reply packet returned by the program code includes only the workflow.

As aforementioned, FIGS. 8-9 are workflows 800 900 that illustrate how debugging requests are handled in system where the aspects discussed herein are implemented, including but not limited to the architecture of FIG. 5. The additional aspects added in this example are shaded in the workflows 800 900. In this example, various aspects are separated into modules not to suggest any limitations but for ease of understanding and illustration. The configuration of the different functionalities can differ. The workflow 800 of FIG. 8 illustrates a scenario in which the security level of the command is greater than that of the system or user and hence, permission to the debugging file (or at least the entirety of the file with all the value) is denied by the program code. The workflow 900 of FIG. 9 illustrates a scenario where certain of the debug results can be provided to the user but certain of the results are of a security level that exceeds the system security level in confidential computing (or the user security level). Thus, the packet returned to the user for the debugging command has been edited to remove data that is of a higher security level. References to elements of the technical architecture 500 of FIG. 5 are made throughout these workflows 800 900 for illustrative purposes, only.

In FIG. 8, the end user obtains either a packet that denies permission to certain of the debugging data or to the reply packet for the command issued. In FIG. 9, the end user obtains either a scrubbed packet with certain of the debugging data sought by a command issued or all the data sought by the command issued. This functionality is governed both by a combination of the security level of the system (or user) and that of the debugging command. As a non-limiting example, in FIG. 8 the end user issues a print command and in FIG. 9 the end user issues a backtrace command. The print command is at a level 2 and the backtrace command returns debugging data at a level 1 and at a level 2. Because the command itself has different security levels, rather than providing a binary response, depending on the security level of the system (or user), the end user can obtain some but not all of the debugging data requested in the latter example.

Referring to FIG. 8, based on receiving input from an end user 509, program code comprising a debugger client 529 prints a backtrace of a microservice 507 in a TEE 506 (e.g., a confidential computing environment) (810). The print command is a level 2 command, as illustrated in FIG. 6. The program code of the debugger client 529 packages the print command (e.g., in a CMD request packet 531) to send the print command (print CMD request packet) (815) to the program code of the privilege separation secure channel server 523, which forwards the packet to the privilege separation secure channel client 550 (thus, the program code of the privilege separation secure channel client 550 has intercepted the packet) (820). Program code of the debugger security analysis module 557 analyzes the packet 533 (825) and determines the confidential computing security level. The print command only has one level. The program code determines if the confidential computing security level was set to either: 1) workflow observation; or 2) one of data observation or workflow and data operation (830). The print command is a data observation command and thus, if the security level of the computing system or the user is workflow observation, the print debugging results are not available to the client 509. However, if the confidential computing security level is one of data observation or workflow and data operation, the level of the command or a higher level, the print command debugging results can be returned to the end user 509.

Returning to FIG. 9, if the program code determines that the security level for confidential computing is one of data observation or workflow and data operation, the program code of the privilege separation secure channel client 550 sends the command request packet to a debugger server 537 (835) and the program code of the debugger server obtains or generates a CMD reply packet (based on debugging the microservice 507) (840). Program code of the privilege separation secure channel client 550 sends the reply packet to the user 509 via the privilege separate secure channel server 523 (845).

However, if the program code determines that the security level for confidential computing is workflow observation, which is below the level of the print command, the program code of the debugger CMD reply packet generating and cleaning module 555 generates the reply packet (834), which contains a permission denied code 837, and sends the reply packet to the user 509 via the privilege separate secure channel server 523 (845).

Depending on the security level, the end user 509 obtains either the print debugging results or a packet with a permission denied code. Depending on the security level determination and following aspects of the workflow, a type of reply packet is provided to the end user 509. Once the program code of the privilege separation secure channel server 523 obtains a CMD reply packet, this program code sends the reply packet to the debugger client 529 (850) and the program code of the debugger client 529 sends the reply packet 533 to the end user 509 (855).

Referring to FIG. 9, based on receiving input from an end user 509, program code comprising a debugger client 529 prints a backtrace of a microservice 507 in a TEE 506 (e.g., a confidential computing environment) (910). The program code of the debugger client 529 packages the backtrace command (e.g., in a CMD request packet 531) to send the backtrace command (backtrace CMD request packet) (915) to the program code of the privilege separation secure channel server 523, which forwards the packet to the privilege separation secure channel client 550 (thus, the program code of the privilege separation secure channel client 550 has intercepted the packet) (920). Program code of the debugger security analysis module 557 analyzes the packet 533 (925) and in this example, determines that the CMD request packet includes multiple security levels (926). As such, program code of the separation secure channel client 550 sends the CMD request packet 531 to a debugger server 537 (in the TEE 506) (930). Program code of the debugger server 537 generates a CMD reply packet 533, which the program code sends to program code comprising the separation secure channel client 550 (935).

Program code of the debugger security analysis module 557 analyzes the CMD reply packet 553 (925) (earlier the command packet was analyzed) and determines the security level of the system or user (945). Given that the command is a backtrace command, and hence can include data at various security levels, the program code determines if the confidential computing security level was set to either: 1) workflow observation; or 2) one of data observation or workflow and data operation.

If the system security level is workflow observation, portions of the command reply that are of a higher security level should not be provided the end user. Thus, as illustrated in FIG. 9, if the security level is workflow observation (security 1), the program code of the privilege separation secure channel client 550 sends the reply packet to the debugger CMD reply packet generating and cleaning module 557 and the program code of the latter module erases the data in reply packet that is of a higher security level than workflow observation and generates a reply packet that does not include these elements (950). FIG. 9 illustrates data variables being erased from the packet 953, which are the elements erased on FIG. 7B, which was provided as an illustrative example. Only after the program code recreates the packet without the erased values (950) can the program code provide the reply packet to the privilege separation secure channel client 550 to return to the user 509 via the privilege separate secure channel server 523 (955). In this altered version of the reply packet, only the information of the function stack is retained. All values of the variables have been erased to prevent data leakage caused by debugging.

If the system or user security level is one of data observation or workflow and data operation, then all the results from the backtrace can be returned to the end user 509, as the backtrace command itself can only be a level 2 command and level 3 would be higher than a level 2 and the results produced by the backtrace would be, at most level 2. As such, the program code of the privilege separation secure channel client 550 sends the reply packet (which includes the variables) to the user 509 via the privilege separate secure channel server 523 (955).

Once the program code of the privilege separate secure channel server 523 obtains a CMD reply packet, this program code sends the reply packet to the debugger client 529 (960) and the program code of the debugger client 529 sends the reply packet 533 to the end user 509 (965).

Although various embodiments are described above, these are only examples. For example, reference architectures of many disciplines may be considered, as well as other knowledge-based types of code repositories, etc., may be considered. Many variations are possible.

The examples herein include a computer-implemented method for securely debugging a microservice executing in a confidential computing environment. In some examples, program code executing on one or more processors in the confidential computing environment obtains, from an untrusted computing resource, via a secure channel between the confidential computing environment and the untrusted computing resource, a debugging command in a command request packet. The program code analyzes command request packet to determine a security level for the debugging command and a security level for the confidential computing environment, where the analyzing comprising comparing a quantitative value of the security level for the debugging command to a quantitative value of the security level for the confidential computing environment. The program code generates a command reply packet, where contents of the command reply packet are based on the comparing. The program code transmits the command reply packet to the untrusted computing resource via the secure channel. By enabling the execution of debugging commands in a confidential computing environment but limited the responsive data received by the user who initiated the command based on verifying security levels (which are associated with data exposure) of the confidential computing environment and the debugging command to which the user seeks a response, the examples herein can provide useful debugging information to a user without exposing confidential information guarded in the confidential computing environment. Thus, a user can debug microservices executing within the environment without data or registers being exposed outside of the confidential computing environment.

In some examples, the command reply packet comprises a permission denied message. Various debugging commands can request data that, if provided outside of a confidential computing environment, could compromise the integrity of the confidential computing environment itself. This feature enables the program code to determine when the benefit of debugging data is outweighed by potential exposure and to respond to a user request in a manner that represents this circumstance.

In some examples, comparing the quantitative value of the security level for the debugging command to the quantitative value of the security level for the confidential computing environment, includes the program code determining, that the quantitative value of the security level for the debugging command is a single value. The program code can also determine that the single value is larger than the quantitative value of the security level for the confidential computing environment. Certain debugging commands, depending on the command request, can request different types of information. Some examples herein can evaluate a command packet to determine if the command is associated with only one level. In this case, the program code can determine whether the debugging command requests data that, if provided outside of a confidential computing environment, could compromise the integrity of the confidential computing environment itself. Making this determination through packet analysis at this juncture increases processing efficiency because the program code can then determine whether to provide a reply packet to the command, or not.

In some examples, the command reply packet comprises debugging data responsive to the debugging command. This aspect provides a technical advantage because debugging data is provided to a user without compromising the security of the environment. A user can utilize these data to debug a microservice executing within the confidential computing environment, which enables a user to optimize performance of the microservice within the confidential computing environment.

In some examples, comparing the quantitative value of the security level for the debugging command to the quantitative value of the security level for the confidential computing environment includes the program code determining that the quantitative value of the security level for the debugging command is a single value. The program code can determine that the single value is not larger than the quantitative value of the security level for the confidential computing environment. This aspect provides a technical advantage because by analyzing a command packet at an initial phase enables the program code to process the request (debugging command), efficiently. By determining that there is a single security level, the program code can generate a response promptly without additional processing, enabling the user to obtain debugging data efficiently such that the user can address any potential issues with the microservice.

In some examples, the program code comparing the quantitative value of the security level for the debugging command to the quantitative value of the security level for the confidential computing environment, includes the program code determining that the quantitative value of the security level for the debugging command comprises more than one value. The program code can also determine that each value of the more than one value is not larger than the quantitative value of the security level for the confidential computing environment. This aspect provide a technical advantage by providing debugging data for a microservice executing in a confidential computing environment without compromising the integrity of the environment because in this example, the analysis enables the program code to potentially provide certain types of data and to evaluate where to set a limit to the data provides where the limit indicates where a security risk would emerge.

In some examples, the command reply packet comprises debugging data responsive to the debugging command edited to remove values of variables. This aspect provide a technical advantage at least because the program code has determined which data would potentially expose confidential computing data and which data could assist with debugging without introducing this risk. Thus, the program code removes the data which could present a risk, enabling effective debugging of a microservice without introducing security concerns.

In some examples, comparing the quantitative value of the security level for the debugging command to the quantitative value of the security level for the confidential computing environment includes the program code determining that the quantitative value of the security level for the debugging command comprises more than one value. The program code can determine that a value of the more than one value is not larger than the quantitative value of the security level for the confidential computing environment. This aspect provides a technical advantage at least because a debugging command can request data that presents different security concerns, if provided to a resource outside of a confidential computing environment. The technical advantages of this aspect also include enabling effective debugging with an understanding of the security concerns. Thus, analyzing a command to determine whether any part of its responsive data would pose a security issue, even if the response to the command were to include data of different security levels, would increase processing efficiency as it would prevent commands from executing that do not meet security requirements in addition to providing a security benefit.

In some examples, the security level for the confidential computing environment associated with the value of the more than one value that is not larger than the quantitative value of the security level for the confidential computing environment and is associated with workflow observation. The remaining values of the more than one value are associated data observation. Tiering the security levels in this manner provides an advantage by enabling a user to execute a debugging command that allows for observation of a workflow without exposing data and registers within the confidential computing environment. The debugging data related to the workflow itself can provide a user with information that can enable the user to understand the progression of the microservice and work to improve its processing.

In some examples, generating the command reply packet includes the program code executing the debugging command on the microservice. The program code obtains debugging data responsive to the debugging command. The program code scrubs the debugging data to remove the values of variables. The program code generates the command reply packet without the scrubbed debugging data. To improve debugging efficiency, the program code evaluates commands and provides a security clearance in advance of executing the debugging commands and obtaining replies. This aspect increases the processing efficiency of the system. Additionally, the program code performs the scrubbing under the described circumstances, which also guards the processing efficiency of the system. As aforementioned, the program code provides results in accordance with the security protocols described so useful debugging data can aid in optimizing the microservice while maintaining the security and data integrity of the confidential computing environment.

In some examples, the security level for the debugging command is selected from the group consisting of: workflow observation, data observation, and workflow and data operation. Separating data requested via debugging commands into levels that designate the exposure of data and registers in the confidential computing environment by providing the results enables the program code to perform an efficient security check to enable debugging results to be provided efficiently, provided that these debugging results are commensurate with the security check.

In some examples, the security level for the confidential computing environment is selected from the group consisting of: workflow observation, data observation, and workflow and data operation. By simplifying security levels into three tiers, certain examples herein provide a technical advantage of distilling potentially complex security concerns into an efficient process that enables the continued effective and efficient operation of the confidential computing environment.

The examples herein include a computer system for securely debugging a microservice executing in a confidential computing environment. The computer system can include a memory and one or more processors in communication with the memory. The computer system is configured to perform a method. In some examples, program code executing on the one or more processors, which are in the confidential computing environment, obtains, from an untrusted computing resource, via a secure channel between the confidential computing environment and the untrusted computing resource, a debugging command in a command request packet. The program code analyzes command request packet to determine a security level for the debugging command and a security level for the confidential computing environment, where the analyzing comprising comparing a quantitative value of the security level for the debugging command to a quantitative value of the security level for the confidential computing environment. The program code generates a command reply packet, where contents of the command reply packet are based on the comparing. The program code transmits the command reply packet to the untrusted computing resource via the secure channel. By enabling the execution of debugging commands in a confidential computing environment but limited the responsive data received by the user who initiated the command based on verifying security levels (which are associated with data exposure) of the confidential computing environment and the debugging command to which the user seeks a response, the examples herein can provide useful debugging information to a user without exposing confidential information guarded in the confidential computing environment. Thus, a user can debug microservices executing within the environment without data or registers being exposed outside of the confidential computing environment.

In some examples of the computer system, the command reply packet comprises a permission denied message. Various debugging commands can request data that, if provided outside of a confidential computing environment, could compromise the integrity of the confidential computing environment itself. This feature enables the program code to determine when the benefit of debugging data is outweighed by potential exposure and to respond to a user request in a manner that represents this circumstance.

In some examples of the computer system, comparing the quantitative value of the security level for the debugging command to the quantitative value of the security level for the confidential computing environment, includes the program code determining, that the quantitative value of the security level for the debugging command is a single value. The program code can also determine that the single value is larger than the quantitative value of the security level for the confidential computing environment. Certain debugging commands, depending on the command request, can request different types of information. Some examples herein can evaluate a command packet to determine if the command is associated with only one level. In this case, the program code can determine whether the debugging command requests data that, if provided outside of a confidential computing environment, could compromise the integrity of the confidential computing environment itself. Making this determination through packet analysis at this juncture increases processing efficiency because the program code can then determine whether to provide a reply packet to the command, or not.

In some examples of the computer system, the command reply packet comprises debugging data responsive to the debugging command. This aspect provides a technical advantage because debugging data is provided to a user without compromising the security of the environment. A user can utilize these data to debug a microservice executing within the confidential computing environment, which enables a user to optimize performance of the microservice within the confidential computing environment.

In some examples of the computer system, comparing the quantitative value of the security level for the debugging command to the quantitative value of the security level for the confidential computing environment includes the program code determining that the quantitative value of the security level for the debugging command is a single value. The program code can determine that the single value is not larger than the quantitative value of the security level for the confidential computing environment. This aspect provides a technical advantage because by analyzing a command packet at an initial phase enables the program code to process the request (debugging command), efficiently. By determining that there is a single security level, the program code can generate a response promptly without additional processing, enabling the user to obtain debugging data efficiently such that the user can address any potential issues with the microservice.

In some examples of the computer system, the program code comparing the quantitative value of the security level for the debugging command to the quantitative value of the security level for the confidential computing environment, includes the program code determining that the quantitative value of the security level for the debugging command comprises more than one value. The program code can also determine that each value of the more than one value is not larger than the quantitative value of the security level for the confidential computing environment. This aspect provide a technical advantage by providing debugging data for a microservice executing in a confidential computing environment without compromising the integrity of the environment because in this example, the analysis enables the program code to potentially provide certain types of data and to evaluate where to set a limit to the data provides where the limit indicates where a security risk would emerge.

In some examples of the computer system, the command reply packet comprises debugging data responsive to the debugging command edited to remove values of variables. This aspect provide a technical advantage at least because the program code has determined which data would potentially expose confidential computing data and which data could assist with debugging without introducing this risk. Thus, the program code removes the data which could present a risk, enabling effective debugging of a microservice without introducing security concerns.

In some examples of the computer system, comparing the quantitative value of the security level for the debugging command to the quantitative value of the security level for the confidential computing environment includes the program code determining that the quantitative value of the security level for the debugging command comprises more than one value. The program code can determine that a value of the more than one value is not larger than the quantitative value of the security level for the confidential computing environment. This aspect provides a technical advantage at least because a debugging command can request data that presents different security concerns, if provided to a resource outside of a confidential computing environment. The technical advantages of this aspect also include enabling effective debugging with an understanding of the security concerns. Thus, analyzing a command to determine whether any part of its responsive data would pose a security issue, even if the response to the command were to include data of different security levels, would increase processing efficiency as it would prevent commands from executing that do not meet security requirements in addition to providing a security benefit.

In some examples of the computer system, the security level for the confidential computing environment associated with the value of the more than one value that is not larger than the quantitative value of the security level for the confidential computing environment and is associated with workflow observation. The remaining values of the more than one value are associated data observation. Tiering the security levels in this manner provides an advantage by enabling a user to execute a debugging command that allows for observation of a workflow without exposing data and registers within the confidential computing environment. The debugging data related to the workflow itself can provide a user with information that can enable the user to understand the progression of the microservice and work to improve its processing.

In some examples of the computer system, generating the command reply packet includes the program code executing the debugging command on the microservice. The program code obtains debugging data responsive to the debugging command. The program code scrubs the debugging data to remove the values of variables. The program code generates the command reply packet without the scrubbed debugging data. To improve debugging efficiency, the program code evaluates commands and provides a security clearance in advance of executing the debugging commands and obtaining replies. This aspect increases the processing efficiency of the system. Additionally, the program code performs the scrubbing under the described circumstances, which also guards the processing efficiency of the system. As aforementioned, the program code provides results in accordance with the security protocols described so useful debugging data can aid in optimizing the microservice while maintaining the security and data integrity of the confidential computing environment.

In some examples of the computer system, the security level for the debugging command is selected from the group consisting of: workflow observation, data observation, and workflow and data operation. Separating data requested via debugging commands into levels that designate the exposure of data and registers in the confidential computing environment by providing the results enables the program code to perform an efficient security check to enable debugging results to be provided efficiently, provided that these debugging results are commensurate with the security check.

In some examples of the computer system, the security level for the confidential computing environment is selected from the group consisting of: workflow observation, data observation, and workflow and data operation. By simplifying security levels into three tiers, certain examples herein provide a technical advantage of distilling potentially complex security concerns into an efficient process that enables the continued effective and efficient operation of the confidential computing environment.

The examples herein include a computer program product for securely debugging a microservice executing in a confidential computing environment. The computer program product comprises one or more computer readable storage media and program instructions collectively stored on the one or more computer readable storage media readable by at least one processing circuit. When read by the processing circuit, a program instruction (which can be referred to as program code) obtains, from an untrusted computing resource, via a secure channel between the confidential computing environment and the untrusted computing resource, a debugging command in a command request packet. The program code analyzes command request packet to determine a security level for the debugging command and a security level for the confidential computing environment, where the analyzing comprising comparing a quantitative value of the security level for the debugging command to a quantitative value of the security level for the confidential computing environment. The program code generates a command reply packet, where contents of the command reply packet are based on the comparing. The program code transmits the command reply packet to the untrusted computing resource via the secure channel. By enabling the execution of debugging commands in a confidential computing environment but limited the responsive data received by the user who initiated the command based on verifying security levels (which are associated with data exposure) of the confidential computing environment and the debugging command to which the user seeks a response, the examples herein can provide useful debugging information to a user without exposing confidential information guarded in the confidential computing environment. Thus, a user can debug microservices executing within the environment without data or registers being exposed outside of the confidential computing environment.

In some examples of the computer program product, the command reply packet comprises a permission denied message. Various debugging commands can request data that, if provided outside of a confidential computing environment, could compromise the integrity of the confidential computing environment itself. This feature enables the program code to determine when the benefit of debugging data is outweighed by potential exposure and to respond to a user request in a manner that represents this circumstance.

In some examples of the computer program product, comparing the quantitative value of the security level for the debugging command to the quantitative value of the security level for the confidential computing environment, includes the program code determining, that the quantitative value of the security level for the debugging command is a single value. The program code can also determine that the single value is larger than the quantitative value of the security level for the confidential computing environment. Certain debugging commands, depending on the command request, can request different types of information. Some examples herein can evaluate a command packet to determine if the command is associated with only one level. In this case, the program code can determine whether the debugging command requests data that, if provided outside of a confidential computing environment, could compromise the integrity of the confidential computing environment itself. Making this determination through packet analysis at this juncture increases processing efficiency because the program code can then determine whether to provide a reply packet to the command, or not.

In some examples of the computer program product, the command reply packet comprises debugging data responsive to the debugging command. This aspect provides a technical advantage because debugging data is provided to a user without compromising the security of the environment. A user can utilize these data to debug a microservice executing within the confidential computing environment, which enables a user to optimize performance of the microservice within the confidential computing environment.

In some examples of the computer program product, comparing the quantitative value of the security level for the debugging command to the quantitative value of the security level for the confidential computing environment includes the program code determining that the quantitative value of the security level for the debugging command is a single value. The program code can determine that the single value is not larger than the quantitative value of the security level for the confidential computing environment. This aspect provides a technical advantage because by analyzing a command packet at an initial phase enables the program code to process the request (debugging command), efficiently. By determining that there is a single security level, the program code can generate a response promptly without additional processing, enabling the user to obtain debugging data efficiently such that the user can address any potential issues with the microservice.

In some examples of the computer program product, the program code comparing the quantitative value of the security level for the debugging command to the quantitative value of the security level for the confidential computing environment, includes the program code determining that the quantitative value of the security level for the debugging command comprises more than one value. The program code can also determine that each value of the more than one value is not larger than the quantitative value of the security level for the confidential computing environment. This aspect provide a technical advantage by providing debugging data for a microservice executing in a confidential computing environment without compromising the integrity of the environment because in this example, the analysis enables the program code to potentially provide certain types of data and to evaluate where to set a limit to the data provides where the limit indicates where a security risk would emerge.

In some examples of the computer program product, the command reply packet comprises debugging data responsive to the debugging command edited to remove values of variables. This aspect provide a technical advantage at least because the program code has determined which data would potentially expose confidential computing data and which data could assist with debugging without introducing this risk. Thus, the program code removes the data which could present a risk, enabling effective debugging of a microservice without introducing security concerns.

In some examples of the computer program product, comparing the quantitative value of the security level for the debugging command to the quantitative value of the security level for the confidential computing environment includes the program code determining that the quantitative value of the security level for the debugging command comprises more than one value. The program code can determine that a value of the more than one value is not larger than the quantitative value of the security level for the confidential computing environment. This aspect provides a technical advantage at least because a debugging command can request data that presents different security concerns, if provided to a resource outside of a confidential computing environment. The technical advantages of this aspect also include enabling effective debugging with an understanding of the security concerns. Thus, analyzing a command to determine whether any part of its responsive data would pose a security issue, even if the response to the command were to include data of different security levels, would increase processing efficiency as it would prevent commands from executing that do not meet security requirements in addition to providing a security benefit.

In some examples of the computer program product, the security level for the confidential computing environment associated with the value of the more than one value that is not larger than the quantitative value of the security level for the confidential computing environment and is associated with workflow observation. The remaining values of the more than one value are associated data observation. Tiering the security levels in this manner provides an advantage by enabling a user to execute a debugging command that allows for observation of a workflow without exposing data and registers within the confidential computing environment. The debugging data related to the workflow itself can provide a user with information that can enable the user to understand the progression of the microservice and work to improve its processing.

In some examples of the computer program product, generating the command reply packet includes the program code executing the debugging command on the microservice. The program code obtains debugging data responsive to the debugging command. The program code scrubs the debugging data to remove the values of variables. The program code generates the command reply packet without the scrubbed debugging data. To improve debugging efficiency, the program code evaluates commands and provides a security clearance in advance of executing the debugging commands and obtaining replies. This aspect increases the processing efficiency of the system. Additionally, the program code performs the scrubbing under the described circumstances, which also guards the processing efficiency of the system. As aforementioned, the program code provides results in accordance with the security protocols described so useful debugging data can aid in optimizing the microservice while maintaining the security and data integrity of the confidential computing environment.

In some examples of the computer program product, the security level for the debugging command is selected from the group consisting of: workflow observation, data observation, and workflow and data operation. Separating data requested via debugging commands into levels that designate the exposure of data and registers in the confidential computing environment by providing the results enables the program code to perform an efficient security check to enable debugging results to be provided efficiently, provided that these debugging results are commensurate with the security check.

In some examples of the computer program product, the security level for the confidential computing environment is selected from the group consisting of: workflow observation, data observation, and workflow and data operation. By simplifying security levels into three tiers, certain examples herein provide a technical advantage of distilling potentially complex security concerns into an efficient process that enables the continued effective and efficient operation of the confidential computing environment.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for securely debugging a microservice executing in a confidential computing environment, comprising:

obtaining, by one or more processors in the confidential computing environment, from an untrusted computing resource, via a secure channel between the confidential computing environment and the untrusted computing resource, a debugging command in a command request packet;

analyzing, by the one or more processors, the command request packet to determine a security level for the debugging command and a security level for the confidential computing environment, wherein the analyzing comprises comparing a quantitative value of the security level for the debugging command to a quantitative value of the security level for the confidential computing environment;

generating, by the one or more processors, a command reply packet, wherein contents of the command reply packet are based on the comparing, wherein the command reply packet comprises debugging data responsive to the debugging command edited to remove values of variables, and wherein generating the command reply packet comprises:

executing the debugging on the microservice;

obtaining the debugging data responsive to the debugging command;

scrubbing the debugging data to remove the values of variables; and generating the command reply packet without the scrubbed debugging data; and transmitting, by the one or more processors, the command reply packet to the untrusted computing resource via the secure channel.

2. The computer-implemented method of claim 1, wherein the command reply packet comprises a permission denied message.

3. The computer-implemented method of claim 1, wherein comparing the quantitative value of the security level for the debugging command to the quantitative value of the security level for the confidential computing environment, comprises:

determining, by the one or more processors, that the quantitative value of the security level for the debugging command is a single value; and determining, by the one or more processors, that the single value is larger than the quantitative value of the security level for the confidential computing environment.

4. The computer-implemented method of claim 1, wherein the command reply packet comprises debugging data responsive to the debugging command.

5. The computer-implemented method of claim 4, wherein comparing the quantitative value of the security level for the debugging command to the quantitative value of the security level for the confidential computing environment, comprises:

determining, by the one or more processors, that the quantitative value of the security level for the debugging command is a single value; and determining, by the one or more processors, that the single value is not larger than the quantitative value of the security level for the confidential computing environment.

6. The computer-implemented method of claim 4, wherein comparing the quantitative value of the security level for the debugging command to the quantitative value of the security level for the confidential computing environment, comprises:

determining, by the one or more processors, that the quantitative value of the security level for the debugging command comprises more than one value; and determining, by the one or more processors, that each value of the more than one value is not larger than the quantitative value of the security level for the confidential computing environment.

7. The computer-implemented method of claim 1, wherein comparing the quantitative value of the security level for the debugging command to the quantitative value of the security level for the confidential computing environment, comprises:

determining, by the one or more processors, that the quantitative value of the security level for the debugging command comprises more than one value; and determining, by the one or more processors, that a value of the more than one value is not larger than the quantitative value of the security level for the confidential computing environment.

8. The computer-implemented method of claim 7, wherein the security level for the confidential computing environment associated with the value of the more than one value that is not larger than the quantitative value of the security level for the confidential computing environment is associated with workflow observation and wherein remaining values of the more than one value are associated data observation.

9. The computer-implemented method of claim 1, wherein the security level for the debugging command is selected from the group consisting of: workflow observation, data observation, and workflow and data operation.

10. The computer-implemented method of claim 9, wherein the security level for the confidential computing environment is selected from the group consisting of: workflow observation, data observation, and workflow and data operation.

11. A computer system for securely debugging a microservice executing in a confidential computing environment, comprising:

a memory; and one or more processors in communication with the memory, wherein the computer system is configured to perform a method, said method comprising:

obtaining, by the one or more processors in the confidential computing environment, from an untrusted computing resource, via a secure channel between the confidential computing environment and the untrusted computing resource, a debugging command in a command request packet;

analyzing, by the one or more processors, command request packet to determine a security level for the debugging command and a security level for the confidential computing environment, wherein the analyzing comprises comparing a quantitative value of the security level for the debugging command to a quantitative value of the security level for the confidential computing environment;

generating, by the one or more processors, a command reply packet, wherein contents of the command reply are packet based on the comparing, wherein the command reply packet comprises debugging data responsive to the debugging command edited to remove values of variables, and wherein generating the command reply packet comprises:

executing the debugging on the microservice;

obtaining the debugging data responsive to the debugging command;

scrubbing the debugging data to remove the values of variables; and generating the command reply packet without the scrubbed debugging data; and transmitting, by the one or more processors, the command reply packet to the untrusted computing resource via the secure channel.

12. The computer system of claim 11, wherein the command reply packet comprises a permission denied message.

13. The computer system of claim 11, wherein comparing the quantitative value of the security level for the debugging command to the quantitative value of the security level for the confidential computing environment, comprises:

determining, by the one or more processors, that the quantitative value of the security level for the debugging command is a single value; and determining, by the one or more processors, that the single value is larger than the quantitative value of the security level for the confidential computing environment.

14. The computer system of claim 11, wherein the command reply packet comprises debugging data responsive to the debugging command.

15. The computer system of claim 14, wherein comparing the quantitative value of the security level for the debugging command to the quantitative value of the security level for the confidential computing environment, comprises:

determining, by the one or more processors, that the quantitative value of the security level for the debugging command is a single value; and determining, by the one or more processors, that the single value is not larger than the quantitative value of the security level for the confidential computing environment.

16. The computer system of claim 14, wherein comparing the quantitative value of the security level for the debugging command to the quantitative value of the security level for the confidential computing environment, comprises:

determining, by the one or more processors, that the quantitative value of the security level for the debugging command comprises more than one value; and determining, by the one or more processors, that each value of the more than one value is not larger than the quantitative value of the security level for the confidential computing environment.

17. A computer program product for securely debugging a microservice executing in a confidential computing environment, comprising:

one or more computer readable storage media and program instructions collectively stored on the one or more computer readable storage media readable by at least one processing circuit to:

obtain, from an untrusted computing resource, via a secure channel between the confidential computing environment and the untrusted computing resource, a debugging command in a command request packet;

analyze the command request packet to determine a security level for the debugging command and a security level for the confidential computing environment, wherein the analyzing comprises comparing a quantitative value of the security level for the debugging command to a quantitative value of the security level for the confidential computing environment;

generate a command reply packet, wherein contents of the command reply packet are based on the comparing, wherein the command reply packet comprises debugging data responsive to the debugging command edited to remove values of variables, and wherein generating the command reply packet comprises:

execute the debugging on the microservice;

obtain the debugging data responsive to the debugging command;

scrub the debugging data to remove the values of variables; and generate the command reply packet without the scrubbed debugging data; and transmit the command reply packet to the untrusted computing resource via the secure channel.

* * * * *